March 29, 1966  E. A. ERICSON  3,243,662
ELECTRICAL PANELBOARD
Filed Oct. 2, 1962  3 Sheets-Sheet 1

INVENTOR:
ERIC A. ERICSON,
BY David M. Schiller
ATTORNEY.

March 29, 1966   E. A. ERICSON   3,243,662
ELECTRICAL PANELBOARD
Filed Oct. 2, 1962   3 Sheets-Sheet 2
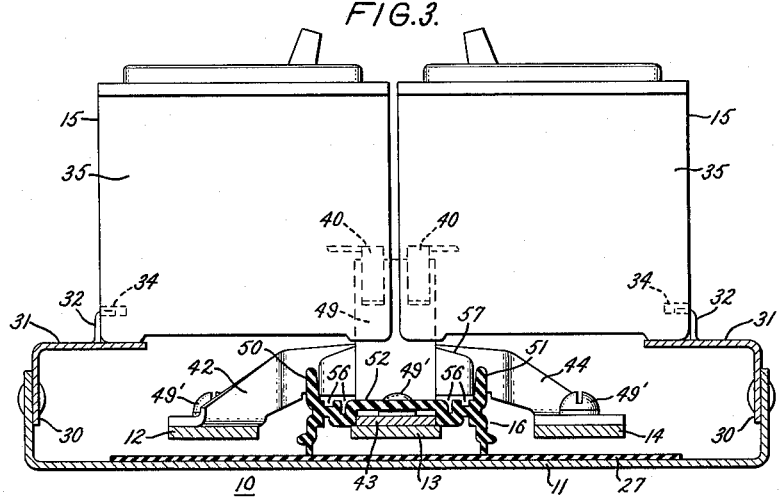
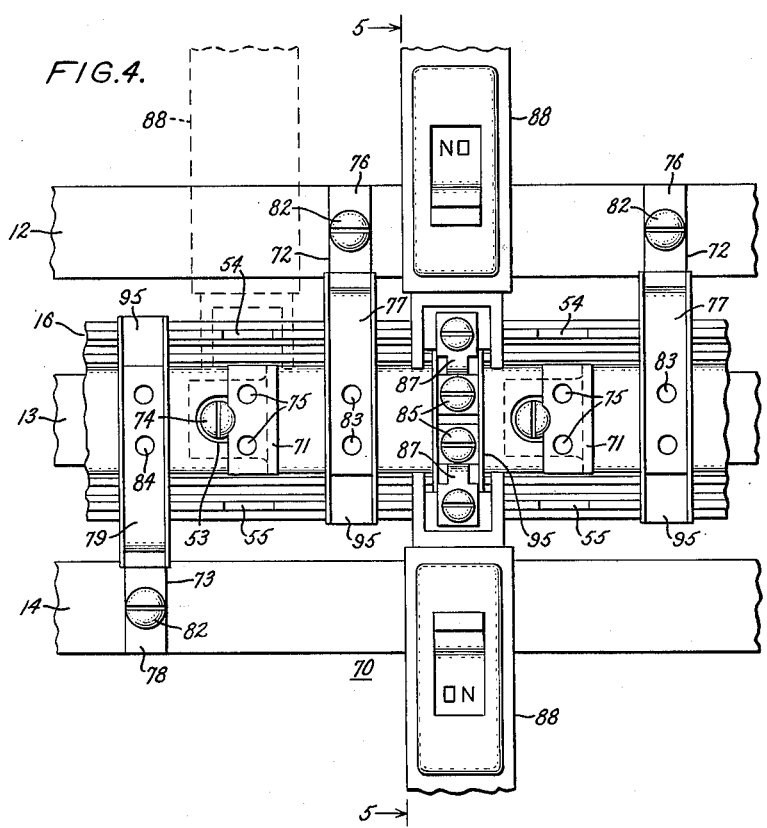
INVENTOR:
ERIC A. ERICSON,
BY David M. Schiller
ATTORNEY.

March 29, 1966      E. A. ERICSON      3,243,662

ELECTRICAL PANELBOARD

Filed Oct. 2, 1962      3 Sheets-Sheet 3

INVENTOR:
ERIC A. ERICSON,
BY David M. Schiller
ATTORNEY.

United States Patent Office 3,243,662
Patented Mar. 29, 1966

---

3,243,662
ELECTRICAL PANELBOARD
Eric A. Ericson, Plainville, Conn., assignor to General Electric Company, a corporation of New York
Filed Oct. 2, 1962, Ser. No. 227,776
13 Claims. (Cl. 317—119)

This invention relates to panelboards and has particular relation to panelboards of the type wherein a plurality of circuit interrupter units are connected to a plurality of bus bars for controlling the distribution of power to branch circuits.

In order to reduce the size and cost of panelboards designs have been proposed wherein the bus bars, the interrupter units, and the connectors between the interrupter units and the bus bars have been very closely spaced. In such designs problems have been encountered in providing effective and economical means for insulating the various energized parts of the panelboard.

The insulation problem has been particularly troublesome in panelboards having sequence phasing wherein adjacent circuit interrupter units are connected alternately to bus bars of different polarity or phase. While a number of insulating arrangements have heretofore been proposed, such arrangements have either been of bulky and expensive construction or have not provided effective insulation between the various energized parts. Further, in many previous designs it has been necessary to provide different insulation arrangements for the various types of panelboards, such as the bolt-in and plug-in types, which include differently configured connectors.

It is therefore an object of the present invention to provide a panelboard including novel and improved means for effectively and economically insulating the various energized parts from one another.

It is another object of the invention to provide a panelboard having a novel and improved insulator which is of simple and inexpensive construction and which effectively maintains adequate air spacing and creepage distances between energized parts.

It is a further object of the invention to provide a panelboard including a novel and improved insulator which may be economically manufactured in any desired length, which effectively insulates energized parts from one another and maintains the connectors of the bus bars in proper position and alignment, and which may be employed in different type panelboards which include differently configured connectors.

In carrying out the invention in one form, a panelboard is provided including a mounting plate with spaced insulating supports at opposite ends thereof which support three bus bars in spaced parallel relation substantially in a common plane. Longitudinally-extending mounting strips are secured to the mounting plate for supporting a plurality of circuit interrupter units, such as molded case circuit breakers, in side by side relation in two longitudinally-extending confronting rows.

In order to electrically connect the bus bars and the interrupter units a plurality of connectors are provided on the bus bars having terminal portions which are spaced substantially along the longitudinal center line of the panelboard and which are connected to the interrupter units at areas adjacent the confronting ends of the units. The connectors may be separately attached to the bus bars, such as by screws or rivets, or may be integrally formed therewith.

In order to effectively insulate the various energized parts of the panelboard including the bus bars, connectors, and interrupter units the invention provides an insulating arrangement including a one-piece insulator which is conveniently fabricated by extrusion of roll-forming in any desired length for employment in panelboards of various lengths. The insulator is of generally H-shaped cross section including a pair of spaced longitudinally-extending side walls and a bridge or web extending between and connecting the side walls at areas intermediate the edges thereof. The insulator is positioned with its side walls in the spaces between the center bus bar and the two outer bus bars and with the bridge overlying the center bus bar and extending beyond the edges thereof. The portions of the side walls above the bridge have longitudinally spaced slots through which extend the terminal portions of the connectors on the outer bus bars, and the bridge has a plurality of longitudinally spaced recesses through which extend the connectors on the center bus bar.

The insulator is designed so as to accommodate connectors of either the plug-in stab type or the bolt-in strap type. In installations wherein the connectors are separately secured to the bus bars as by screws, additional channel-shaped insulators are located within the slots of the side walls of the insulator to receive the terminal portions of the connectors. Such additional channel-shaped insulators may be omitted in installations wherein the connectors are formed as integral parts of the bus bars.

Other objects and advantages of the invention will become apparent from the following description taken in conjunction with the accompanying drawings in which:

FIG. 3 is a view taken along the line 3—3 of FIG. 1;

FIG. 4 is a view in top plan of a portion of a panelboard of different construction than that shown in FIG. 1;

Figure 1:
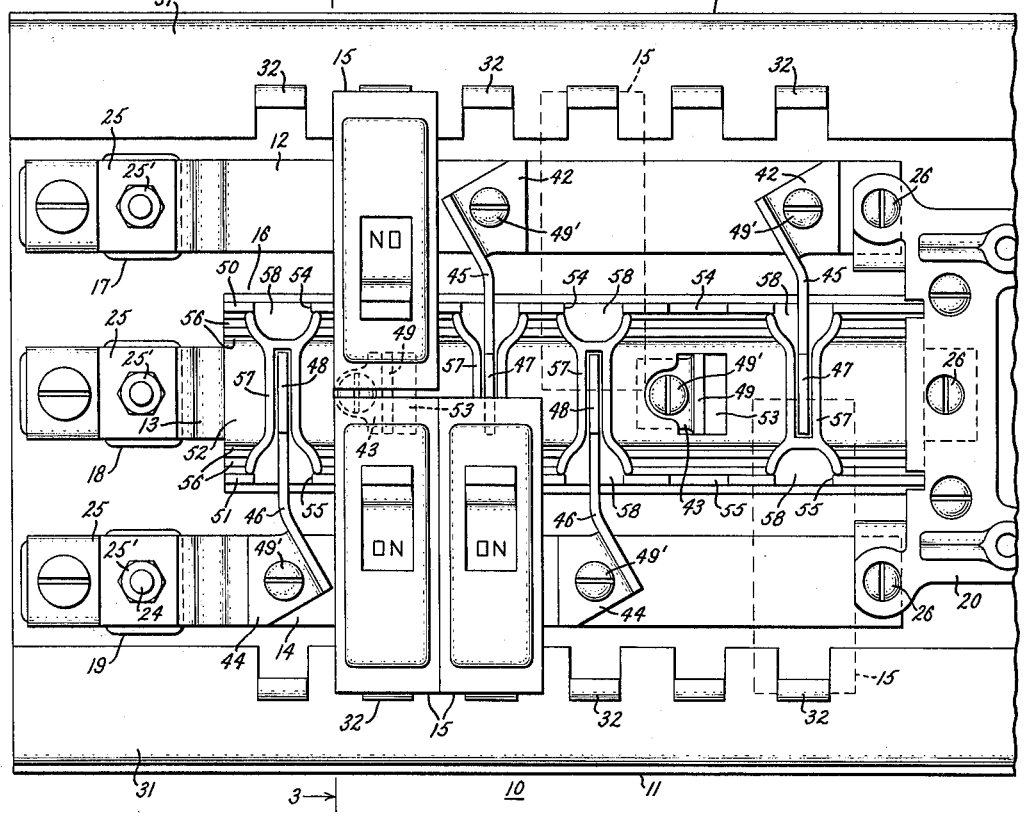
FIG. 1 is a view in top plan of a portion of a panelboard embodying the invention with parts broken away.
Figure 2:
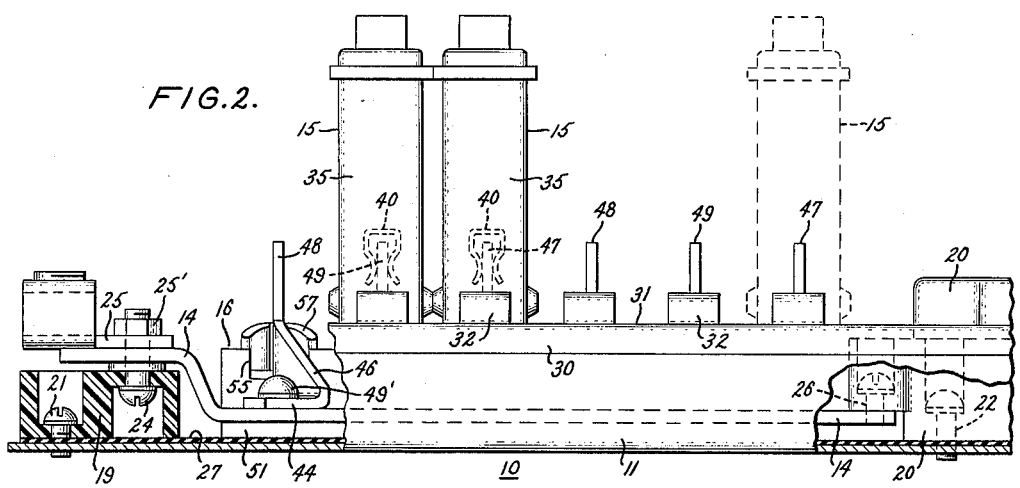
FIG. 2 is a view in side elevation of the device of FIG. 1 with parts broken away.

Referring now to the drawings and particularly to FIGS. 1–3 there is shown a panelboard represented generally by the numeral 10 embodying the present invention. In general, the panelboard 10 includes a substantially channel-shaped mounting plate or pan 11 which supports a plurality of bus bars 12, 13 and 14 electrically connected to a plurality of circuit interrupter units 15, which may comprise molded case circuit breakers, also supported by the mounting plate 11. The energized parts of the panelboard are effectively insulated from one another by an insulator 16 associated with the central bus bar 13 in a manner more fully described hereinafter. The bus bars 12–14 may comprise part of a three phase, three wire alternating current supply system for supplying electrical power to a plurality of branch circuits (not shown) which are controlled by the units 15 connected to the bus bars. Although the panelboard 10 is shown as including three bus bars, the invention is applicable to single phase panelboards including but two bus bars such as the bars 13 and 14.

In order to mount the bus bars 12–14 a plurality of insulating supports are provided at opposite ends of the mounting plate 11. As shown in FIGS. 1 and 2 a plurality of laterally-spaced insulating supports 17, 18 and 19 and a single insulating support 20 are mounted on the plate 11 respectively at the left and right hand ends thereof as viewed in FIG. 1. The supports 17–19 and 20 are secured to the plate 11 by screws 21 and 22 respectively which extend through openings in the supports into threaded openings in the plate 11. The left-hand ends of the bus bars as viewed in FIG. 2 are displaced upwardly from the major planes of the bus bars to overlie the supports 17–19 and are secured to such supports by screws 24 which extend upwardly through openings in the supports, in the bus bar ends, and in connectors 25 above the bus bar ends which receive terminals of supply conductors. Nuts 25' are threaded on the threaded ends of the screws 24 to engage the upper surfaces of the connectors 25. The bus bars are secured at their right-hand ends as viewed in FIG. 2 to the support 20 by screws 26 extending through the support 20 into threaded engagement with threaded openings in the bus bars. The bus bars are thus mounted in parallel spaced relation with the major lengths of the bars lying in a common plane. An insulating sheet 27 rests upon the upper surface of the plate 11 beneath and spaced from the lower surfaces of the bus bars.

In order to mount the circuit breakers 15 a pair of mounting strips 30 (FIG. 3) each of generally L-shaped cross section are riveted or otherwise secured to the side walls of the plate 11 so that the upper legs 31 thereof extend in a common plane as viewed in FIG. 3 towards each other to provide supporting shelves for the outer portions of the breakers 15. A plurality of longitudinally spaced generally L-shaped mounting clips 32 are provided on the legs 31 of each of the strips 30 to provide a slip-off fastening for detachably securing the breakers on the panelboard to permit their ready installation and removal. For this purpose the clips 32 have inwardly projecting outer ends which are adapted to be received in slots 34 formed at the outer ends of the casings 35 of the breakers.

The breakers 15 shown in FIGS. 1-3 are of the so-called plug-in type having contact jaws 40 for frictionally engaging flat terminal parts of a plurality of electro-conductive connectors 42, 43 and 44 secured in any suitable manner to the bus bars 12, 13 and 14 respectively. As will appear hereinafter, circuit breakers having connection facilities different than the plug-in arrangement illustrated in FIGS. 1-3 may also be employed in the panelboard of the present invention. The connectors 43 are associated with the center bus bar 13 and are secured thereto in any suitable manner in longitudinally-spaced relation whereas the connectors 42 and 44 are associated with the outer bus bars 12 and 14 in longitudinally-spaced relation. The connectors 42 and 44 have respectively arms 45 and 46 which extend inwardly from the associated bus bars and which have integrally connected thereto upstanding blade terminals 47 and 48 respectively. Each of the connectors 43 is of generally L-shaped configuration having an upstanding blade terminal 49, the connectors 43 being secured to the center bus bar with their blade terminals 49 extending through a plurality of recesses formed in the insulator 16 as will presently appear hereinafter.

The terminal blades 47-49 of the connectors 42-44 extend generally perpendicular to the common plane of the bus bars and are positioned in aligned longitudinally-spaced relation along substantially the center line of the panelboard. The connector terminal blades are proportioned so that each is capable of receiving the contact jaws of a pair of oppositely disposed breakers 15. With the described arrangement the connectors are positioned in the following phase sequence referred to the bus bars and reading from right to left in FIG. 1; bus bar 12, 13, 14, 12, 13, and 14. With such sequence phasing adjacent ones of the circuit breakers are connected to bus bars of different polarity. As previously stated, the connectors 42-44 may be secured to the associated bus bars in any suitable manner. In the embodiment of FIG. 1, the connectors are secured to the bus bars by screws 49' which extend through openings in flat parts of the connectors into threaded engagement with openings in the bus bars. Other arrangements for mounting the connectors on the bus bars are possible, such as riveting the connectors to the bus bars or forming the connectors as integral parts of the bus bars.

In accord with the invention novel and improved means are provided for effectively insulating the energized parts of the panelboard from one another. Such insulating means comprises the insulator 16 which is economically and conveniently fabricated by extrusion or roll forming to have any desired length. In the embodiment illustrated the insulator 16 is of elongated one-piece construction and is formed of any suitable insulating material, such as polyvinyl chloride, which is capable of being extruded or roll formed to a preselected length. Previous insulating arrangements have included bulky and expensive molded sub-bases which cannot conveniently be formed in various lengths and which add appreciably to the cost, size and weight of a panelboard. As shown in FIG. 1, the insulator 16 is substantially coextensive with the bus bars.

As best shown in FIG. 3, the insulator 16 has a cross section taken in a plane perpendicular to the plane of the bus bars which is of generally H-shaped configuration and includes a pair of spaced substantially parallel side walls 50 and 51 connected by a bridge or web 52 which extends between and connects the side walls at areas thereof intermediate the ends of the side walls. The insulator 16 is positioned so that the bridge 52 overlies the center bus bar 13 and extends beyond the edges thereof with the side walls 50 and 51 in the spaces between the center bus bar 13 and the two outer bars 12 and 14. The bridge 52 of the insulator 16 is formed with a plurality of longitudinally spaced recesses 53 through which extend the terminal blades 49 of the connectors 43 associated with the center bus bar 13.

As best shown in FIG. 1, the parts of the side walls 50 and 51 which are located above the bridge 52 are provided with longitudinally spaced slots 54 and 55 respectively and these slots are preferably arranged in oppositely disposed pairs for a purpose appearing hereinafter. Certain of the slots 54 in the side wall 50 are arranged to receive the arms 45 of the connectors 42 associated with the bus bar 12, whereas certain of the slots 55 in the side wall 51 are arranged to receive the arms 46 of the connectors 44 associated with the bus bar 14.

The insulator 16 may be considered to comprise two oppositely disposed U-shaped channels having a common base and having channel walls extending in opposite directions, the channel walls being defined by the side walls 50 and 51 and the common base comprising the bridge 52. It is noted with reference to FIG. 3 that the center bus bar 13 is disposed within the lower one of the two channels so as to be effectively insulated from the outer bars 12 and 14. The side walls 50 and 51 of the insulator provide the necessary over-surface clearance between the energized parts of the panelboard, and the slots 54 and 55 in such side walls effectively maintain the desired relative positioning between the terminals 42 and 44. Increased creepage distances over the insulation between the energized parts is provided by forming the bridge 52 with a plurality of corrugations 56 extending parallel to the direction of extension of the several bus bars.

As an example of one extrusion process utilized to form the insulator 16, pellets of a suitable insulating material are placed in a heated cylinder in which a piston is moved to force the melted insulating material through an opening in the cylinder having the cross section of the resulting insulator. The shaped insulation emerging from the opening is moved along special guiding fixtures until it cools and sets into its final shape. After the insulation hardens and while still moving away from the cylinder, it is cut into the desired lengths which are subsequently formed with the recesses 53 and the slots 54 and 55.

In certain types of panelboards it is desirable that additional insulation be associated with the connectors 42 and 44 which are associated with the outer bus bars 12 and 14. For example, in panelboards wherein the connectors 43 are secured to the bus bar 13 by means of conventional headed screws, it becomes desirable to provide insulation for the connectors 42 and 44 to insulate the connectors 42 and 44 from the projecting headed ends of the screws utilized to secure the connectors 43 to the bus bar 13.

In the embodiment of FIGS. 1-3 such additional insulation is in the form of a plurality of small blocks 57 (FIG. 6) of molded insulating material each of which includes a base 58 from which projects upwardly a pair of spaced side walls 59 which have outwardly curved ends and which are joined at one end and spaced at the other to define a one way slot 60 adapted to receive the arms 45 and 46 of the connectors 42 and 44. The blocks 57 are positioned relative to the insulator 16 with the bases 58 thereof overlying the bridge 52 and extending transversely thereof into oppositely disposed ones of the slots 54 and 55 and with the open ends of the slots 60 extending toward the outer bus bars to which the associated connectors are secured. With the described arrangement the slot 60 of each block 57 is aligned with a pair of opposed slots 54 and 55 in the side walls of the insulator 16. The insulating blocks 57 are detachably retained by the insulator 16 and may be omitted in those panelboard designs wherein the connectors 43 are riveted to or from an integral part of the associated bus bar 13.

Figure 5:
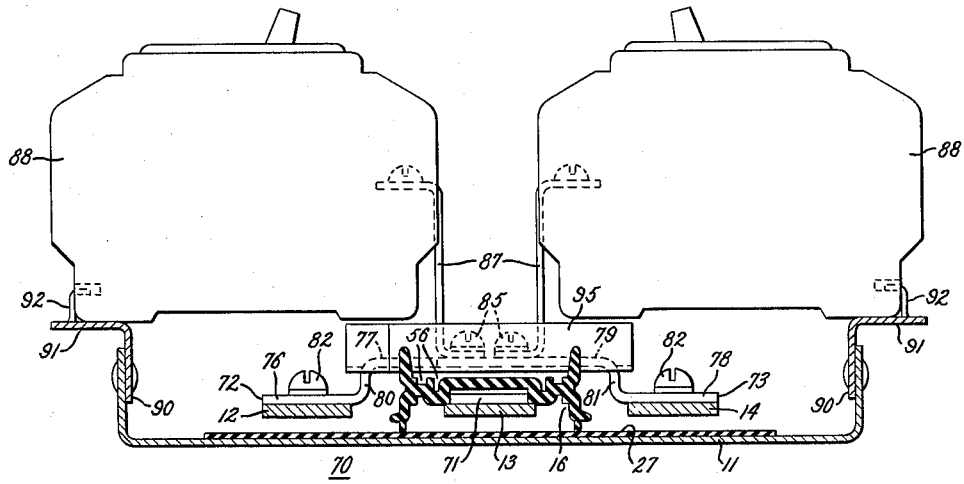
FIG. 5 is a view taken along the line 5—5 of FIG. 4.

FIGS. 4 and 5 illustrate a panelboard represented generally by the numeral 70 which is of different design than the panelboard 10 of FIGS. 1–3. Parts of the panelboard 70 of FIGS. 4 and 5 are similar to corresponding parts of the panelboard 10 and these similar parts are designated by the same reference numerals.

The panelboard 70 differs essentially from the panelboard 10 in that it utilizes electroconductive connectors 71, 72 and 73 of the so-called strap type as distinguished from the connectors 42–44 of the panelboard 10 which are of the stab or plug-in type. In accord with the invention the insulator 16 of the panelboard 10 may also be utilized in the panelboard 70. The strap connectors 71 are associated with the center bus bar 14 and are secured thereto in any suitable manner in longitudinally spaced relation. The connectors 71 are of generally U-shaped configuration having lower legs with openings which receive screws 74 which enter threaded openings of the bus bar 13. The upper or terminal legs of the connectors 71 project through the recesses 53 of the insulator 16 and are formed with two spaced threaded openings 75 which receive screws adapted to extend through openings formed in connecting straps which extend upwardly and outwardly into attachment with terminals of the circuit breakers.

The connector straps 72 and 73 which are associated respectively with the outer bus bars 12 and 14 include respectively pairs of flat portions 76, 77 and 78, 79 disposed in two parallel displaced planes and connected by intermediate parts 80 and 81. The straps 72 and 73 are secured to the bus bars 12 and 14 by screws 82 which extend through openings in the portions 76 and 78 of the straps into threaded openings formed in the outer bus bars. The portions 77 and 79 of the straps 72 and 73 constitute the terminals thereof and such portions are formed respectively with pairs of spaced threaded openings 83 and 84 to receive screws 85 which attach connecting straps 87 to the associated terminal portion, the straps 87 extending upwardly and outwardly for attachment to terminals of the circuit breakers 88. It is noted that the terminal portions of the strap connectors 71–73 lie in planes parallel to the planes of the bus bars.

The circuit breakers 88 of FIGS. 4 and 5 are of somewhat larger size than the circuit breakers 15 of FIGS. 1–3, and are secured to the plate 11 by means of mounting strips 90 riveted or otherwise secured to side walls of the plate 11. The strips 90 are reversed from the strips 30 of FIG. 1 and include outwardly extending parts 91 serving as supporting shelves for supporting the lower rear surfaces of the casings of the breakers 88. L-shaped extensions 92 similar to the extensions 32 of FIG. 1 are provided on the parts 91 to provide slip-off connections for the breakers 88.

Figure 6:
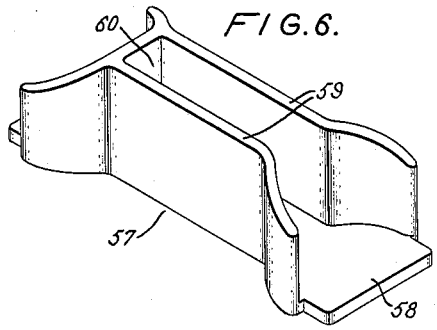
FIG. 6 is a view in perspective of an insulation piece employed in the panelboard of FIGS. 1–3.
Figure 7:
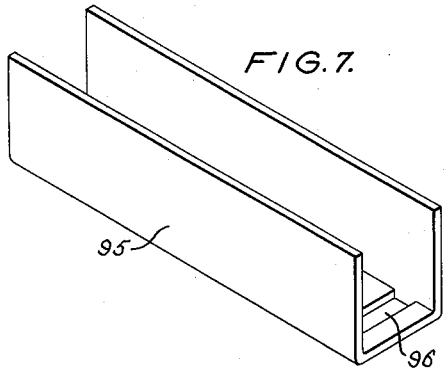
FIG. 7 is a view in perspective of an insulation piece employed in the panelboard of FIGS. 4 and 5.

In the embodiment of FIGS. 4 and 5 auxiliary insulation is provided for the connector straps 72 and 73, and such auxiliary insulation is in the form of a plurality of channel-shaped members 95 (FIG. 7) similar in function to the blocks 57 of FIGS. 1 and 6. The members 95 are positioned within oppositely-disposed slots 54 and 55 in the side walls of the insulator 16 to extend transversely of the bus bars. Each member 95 includes a slot 96 in the base thereof through which extends the center parts 80 and 81 of the associated straps 72 and 73 so that the terminals 77 and 79 of the straps are positioned within the channels of the members 95 and are thus effectively insulated from the adjacent straps. The members 95 are desirably employed in panelboards of the type shown in FIGS. 4 and 5 wherein the connectors 71 are attached to the bus bar 13 by screws having projecting headed portions. In panelboards wherein the connectors 71 are riveted to or formed integrally with the bar 13 the members 95 may be omitted.

Although the insulating parts 57 and 95 are illustrated as being formed separately from the insulator 16, the invention contemplates that they may be formed as integral parts of the insulator 16. As one example, a part of one piece construction may be molded or otherwise formed to include as a part thereof the blocks 57 or the members 95.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a panelboard, a mounting base, first and second bus bars mounted in insulated spaced parallel relation on said mounting base, a plurality of connectors on said bus bars for electrically connecting circuit interrupter units to said bus bars, and an elongated one-piece insulator substantially coextensive with said bus bars, said insulator having a uniform cross-section of generally H-shaped configuration and including spaced side walls extending generally perpendicular to the planes of the bus bars and enclosing said first bus bar, one of said side walls being positioned in the space between said first and second bus bars, and a bridge extending between and connecting said side walls at areas intermediate the edges thereof, said bridge extending beyond the edges of said first bus bar and having corrugations substantially throughout its length extending parallel to the bus bars, the portion of said one side wall above said bridge having longitudinally spaced slots through which extend intermediate portions of said connectors of said second bus bar, and means carried by said insulator positioning said intermediate portions of said connectors of said second bus bar.

2. A panelboard as defined in claim 1 wherein the connectors on each of said bus bars include upstanding blade portions extending generally perpendicular to the planes of the bus bars and spaced along substantially the longitudinal center line of the insulator for plug-in reception of circuit interrupter units.

3. A panelboard as defined in claim 1 wherein the connectors on said bus bars comprise electroconductive straps having flat terminal portions in planes parallel to the planes of the bus bars and lying between the side wall portions of the insulator in longitudinally spaced relation for facilitating bolted electrical connection to circuit interrupter units.

4. In a panelboard, a mounting base, insulating supports at opposite ends of said base, first and second bus bars mounted by said supports in spaced parallel relation, a plurality of connectors on said bus bars for electrically connecting circuit interrupter units to said bus bars, and an elongated one-piece insulator substantially coextensive with said bus bars between said supports, said insulator having a uniform cross section of generally H-shaped configuration and including spaced side walls extending generally perpendicular to the planes of the bus bars, and enclosing said first bus bar, one of said side walls being positioned in the space between said first and second bus bars, and a bridge extending between and connecting said side walls at areas intermediate the edges thereof, said bridge overlying said first bus bar and extending beyond the edges thereof and having corrugations substantially throughout its length extending parallel to the bus bars, said bridge having longitudinally spaced recesses through which portions of the connectors on said first bus bar extend, the portion of said one side wall above said bridge having longitudinally spaced slots through which extend intermediate portions of the connectors on said second bus bar, and means carried by said insulator positioning said intermediate portions of said connectors of said second bus bar.

5. A panelboard as defined in claim 4 wherein the connectors on each of said bus bars include upstanding blade portions extending generally perpendicular to the planes of the bus bars and spaced along substantially the longitudinal center line of the insulator for plug-in reception of circuit interrupter units.

6. A panelboard as defined in claim 4 wherein the connectors on said bus bars comprise electroconductive straps having flat terminal portions in planes parallel to the planes of the bus bars and lying between the side wall portions of the insulator in longitudinally spaced relation for facilitating bolted electrical connection to circuit interrupter units.

7. In a panelboard, a mounting base, insulating supports at opposite ends of said base, at least three bus bars mounted by said supports in spaced parallel relation, a plurality of connectors on said bus bars for electrically connecting circuit interrupter units to said bus bars, and an elongated one-piece insulator substantially coextensive with said bus bars between said supports, said insulator having a uniform cross section of generally H-shaped configuration and including spaced side walls in the spaces between the center bus bar and the outer bus bars and extending generally perpendicular to the planes of the bus bars, and a bridge extending between and connecting said side walls at areas intermediate the edges thereof, said bridge overlying the center bus bar and extending beyond the edges thereof and having corrugations substantially throughout its length extending parallel to the bus bars, said bridge having longitudinally spaced recesses through which portions of the connectors on said center bar extend, portions of said side walls above said bridge having longitudinally spaced slots through which extend intermediate portions of the connectors on the outer bus bars, and means carried by said insulator positioning said intermediate portions of said connectors of said outer bus bars.

8. In a panelboard, a mounting base, insulating supports at opposite ends of said base, at least three bus bars mounted by said supports in spaced parallel relation, a plurality of connectors on said bus bars for electrically connecting circuit interrupter units to said bus bars, and an elongated one-piece insulator extending parallel to said bus bars between said supports, said insulator having a cross section of generally H-shaped configuration and including spaced side walls in the spaces between the center bus bar and the outer bus bars and extending generally perpendicular to the planes of the bus bars, and a bridge extending between and connecting said side walls at areas intermediate the edges thereof, said bridge overlying the center bus bar and extending beyond the edges thereof and having corrugations substantially throughout its length extending parallel to the bus bars, said bridge having longitudinally spaced recesses through which portions of the connectors on said center bar extend, portions of said side walls above said bridge having longitudinally spaced slots through which extend portions of the connectors on the outer bus bars, and a plurality of slotted insulating parts each overlying said bridge and extending transversely thereof with the slot of each part aligned with a separate pair of oppositely positioned ones of said side wall slots, portions of the connectors on the outer bars being positioned within the slots of said insulating parts.

9. A panelboard as defined in claim 8 wherein the connectors for each of said bus bars include upstanding blade portions extending generally perpendicular to the planes of the bus bars and spaced along substantially the longitudinal center line of the insulator for plug-in reception of circuit interrupter units.

10. A panelboard as defined in claim 8 wherein the connectors for said bus bars comprise electroconductive straps having flat terminal portions in planes parallel to the planes of the bus bars and lying between the side wall portions of the insulator in longitudinally spaced relation for electrical connection to circuit interrupter units.

11. In a panelboard, a mounting base, insulating supports at opposite ends of said mounting base, first and second bus bars mounted by said supports in spaced parallel relation in a common plane, a plurality of connectors on said bus bars for electrically connecting circuit interrupter units to the bus bars, and an elongated extruded one-piece insulator extending substantially the full length between said supports parallel to said bus bars, said insulator including a pair of U-shaped channels integrally connected by a common base in opposing relation with the side walls of the two channels extending in opposite directions, said insulator being positioned with said common base overlying the first bar to have the side walls of the lower channel at opposite edges of the first bar so that the first bar is located within the lower channel, said common base having longitudinally spaced recesses through which extend parts of connectors on the first bar, one side wall of the upper channel having longitudinally spaced slots through which extend intermediate parts of the connectors on the second bus bar, said base having corrugations substantially throughout its length extending parallel to said bus bars, and means carried by said insulator positioning said intermediate parts of said connectors of said second bus bar.

12. In a panelboard, a mounting base, insulating supports at opposite ends of said mounting base, first and second bus bars mounted by said supports in spaced parallel relation, a plurality of connectors on said bus bars for electrically connecting circuit interrupter units to said bus bars, and an elongated one-piece insulator substantially coextensive with said bus bars between said supports, said insulator having spaced side walls extending generally perpendicular to the planes of said bus bars and enclosing said first bus bar, one of said side walls being positioned in the space between said first and second bus bars, a bridge extending between and connecting said side walls at areas intermediate the edges thereof, said bridge overlying said first bus bar and extending beyond the edges of said first bus bar, the portion of said one side wall above said bridge having longitudinally spaced first slots through which extend portions of the connectors on said second bus bar, said bridge having longitudinally spaced recesses through which extend connectors on said first bus bar, and a plurality of pairs of insulating upstanding walls spaced along the length of said bridge and overlying the bridge, each pair of insulating walls extending transversely of said bridge and defining a second slot therebetween which is aligned with a separate one of the first slots in said one side wall, portions of the connectors on said second bus bar being positioned within the second slots defined by said pairs of insulating walls.

13. In a panelboard, a mounting base, insulating supports at opposite ends of said mounting base, first and second bus bars mounted by said supports in spaced parallel relation, a plurality of connectors on said bus bars for electrically connecting circuit interrupter units to said bus bars, and an elongated one-piece insulator substantially coextensive with said bus bars between said supports, said insulator having a cross section of generally H-shaped configuration and including spaced side walls extending generally perpendicular to the planes of the bus bars and enclosing said first bus bar, one of said side walls being positioned in the space between said first and second bus bars, a bridge extending between and connecting said side walls at areas intermediate the edges thereof, said bridge overlying said first bus bar and extending beyond the edges thereof and having corrugations substantially throughout its length extending parallel to the bus bars, said bridge having longitudinally spaced recesses through which extend connectors on said first bus, the portion of said one side wall above said bridge having longitudinally spaced first slots through which extend portions of the connectors on said second bus bar, and a plurality of pairs of insulating upstanding walls spaced along the length of said bridge and overlying the bridge, each pair of insulating walls extending transversely of said bridge and defining a second slot therebetween which is aligned with a separate one of the first slots in said one side wall, portions of the connectors on said second bus bar being positioned within the second slot defined by said pairs of insulating walls.

References Cited by the Examiner

UNITED STATES PATENTS

| | | | |
|---|---|---|---|
| 2,606,957 | 8/1952 | Rypinski | 317—119 |
| 3,105,173 | 9/1963 | Kingdon | 317—119 |
| 3,120,628 | 2/1964 | Edmunds | 317—119 |
| 3,164,752 | 1/1965 | Koenig | 317—119 |

ROBERT S. MACON, *Acting Primary Examiner.*

JOHN F. BURNS, KATHLEEN H. CLAFFY,
*Examiners.*

R. L. GABLE, J. J. BOSCO, *Assistant Examiners.*